Dec. 31, 1946.　　D. HANCOCK, JR., ET AL　　2,413,349
CAMERA FOR AERIAL PHOTOGRAPHY
Filed April 17, 1944　　3 Sheets-Sheet 1
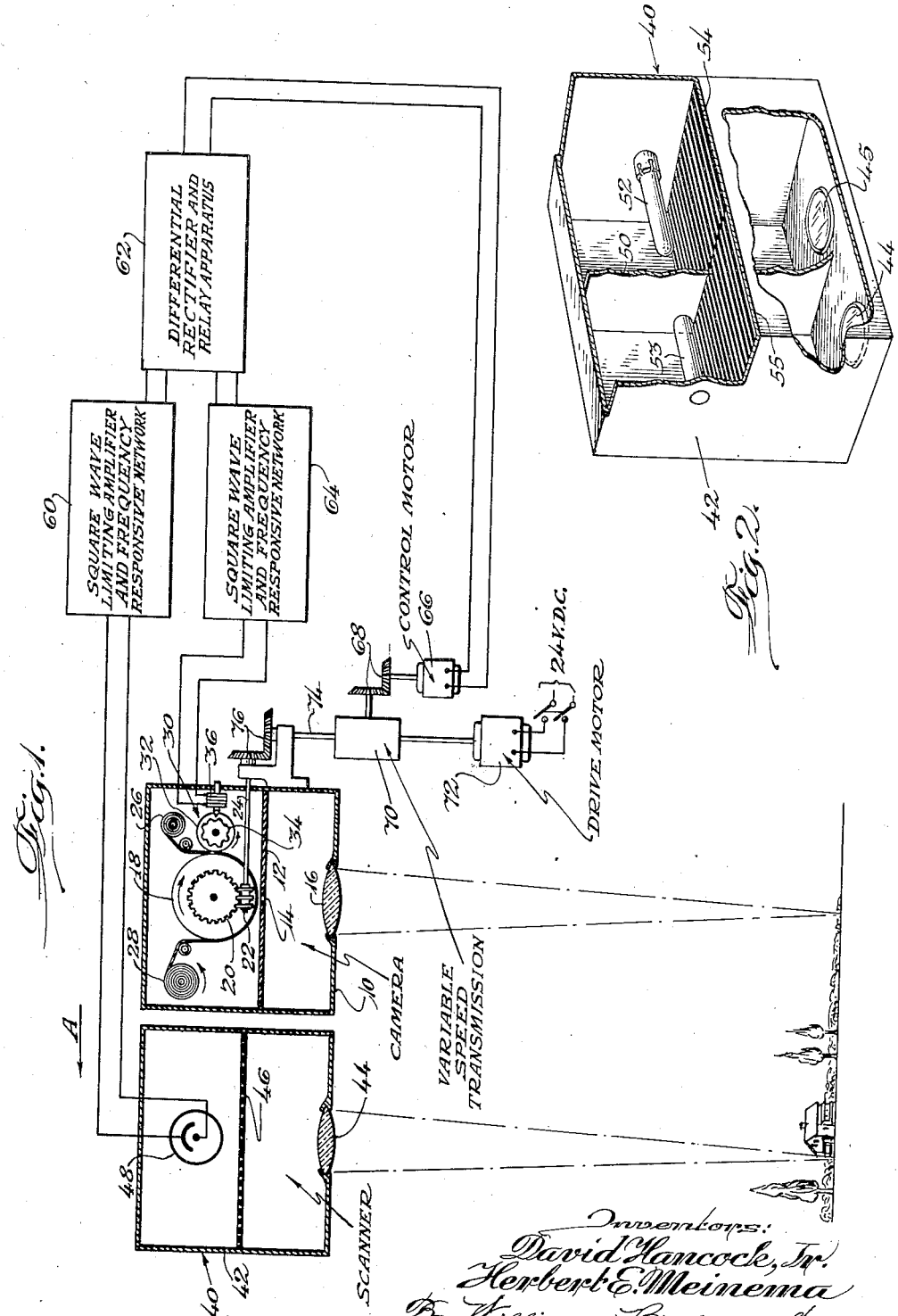

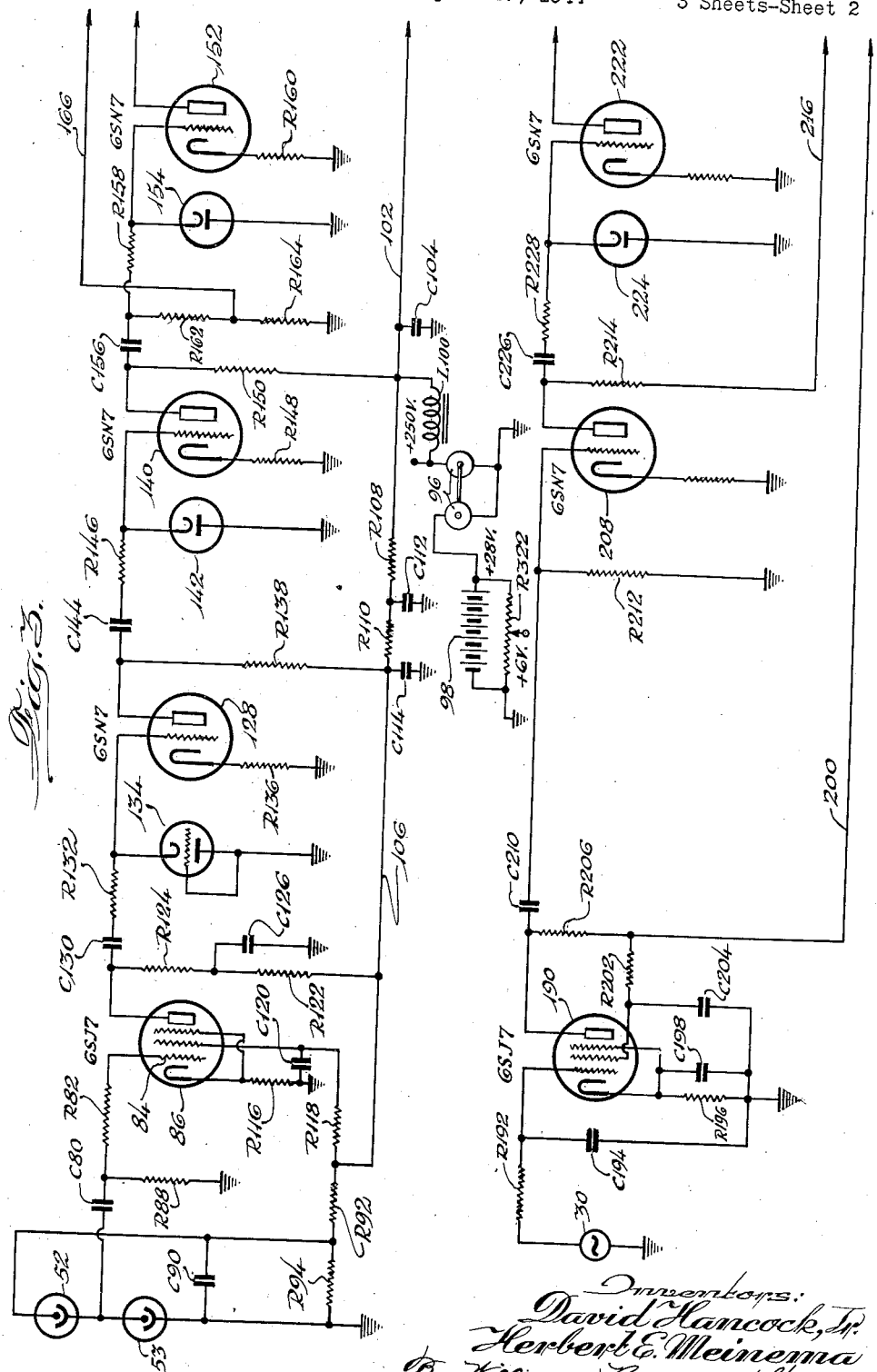

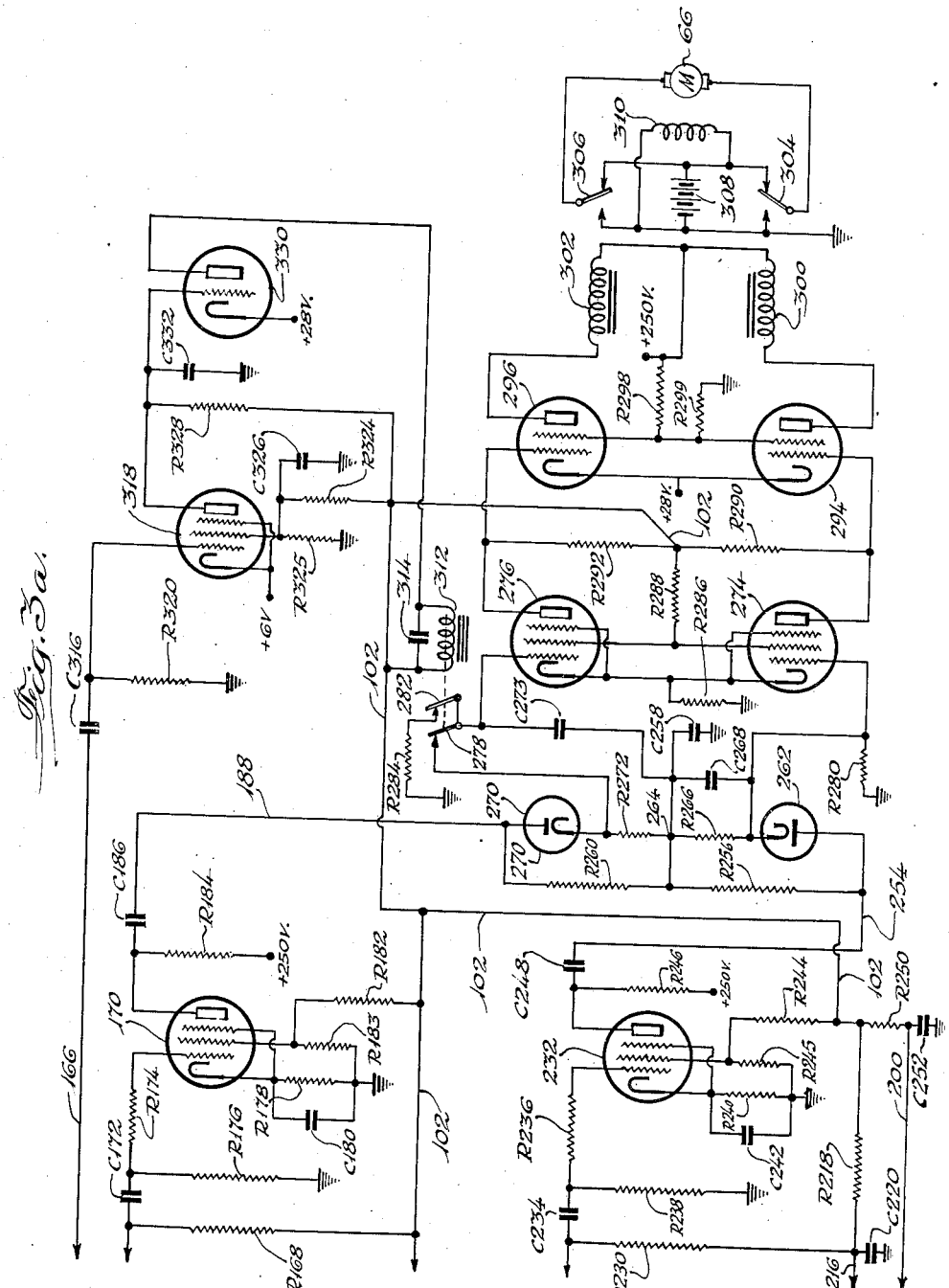

Patented Dec. 31, 1946

2,413,349

UNITED STATES PATENT OFFICE 2,413,349

CAMERA FOR AERIAL PHOTOGRAPHY

David Hancock, Jr., and Herbert E. Meinema, Chicago, Ill.

Application April 17, 1944, Serial No. 531,318

13 Claims. (Cl. 95—12.5)

Our invention relates generally to cameras for aerial photography, and more particularly to a means and method for controlling the speed of film movement in strip film cameras.

Among the various types of cameras used for aerial photography, is a type which has no shutter but in which a continuously moving strip of film is exposed by traversing a narrow transverse slit near the focal plane of the lens system of the camera. If the speed of the film is the same as that at which the optical image of the ground traverses the film exposing slit, it will be apparent that a faithful picture of the terrain over which the photographic airplane has flown, may be obtained.

The speed at which the image of the terrain will traverse the slit, and hence the speed at which the film must be moved in order that an unblurred picture may be obtained, depends upon the altitude of the airplane and its ground speed. Since in various photographic missions both of these factors are variables, it has been a matter of considerable difficulty for the camera operator to make the calculations and adjustments to maintain the film traveling at the proper speed.

Furthermore, cameras of this type are frequently used on small, fast reconnaissance airplanes which carry only the pilot, and, especially over enemy territory, all of the pilot's attention is required to pilot the airplane and he cannot be expected to make the adjustments necessary to change the film speed of the camera whenever the altitude or ground speed of the airplane is changed.

It is therefore a primary object of our invention to provide an improved means for automatically controlling the speed of a camera film so as to maintain it moving at a speed substantially the same as that at which the image of the terrain moves at the plane of the exposed portion of the film.

A further object is to provide an improved camera for aerial photography in which the film is moved continuously at a speed automatically controlled so as to bear a definite relation to the altitude and ground speed of the airplane.

A further object is to provide an improved means for adjusting the speed of movement of the film of a camera for aerial photography in response to the speed of travel of an optical image of the terrain over which the photographic airplane is flying.

Other objects will appear from the following description, reference being had to the accompanying drawings, in which Fig. 1 is a diagrammatic view of the photographic apparatus, including a block diagram of the film speed controlling apparatus;

Fig. 2 is a fragmentary perspective view of the photo-electric scanning box; and Figs. 3 and 3a together constitute a schematic wiring diagram of the film speed controlling circuits and associated apparatus.

The camera for aerial photography diagrammatically illustrated in Fig. 1, is shown as comprising a case 10 having a transverse partition 12 provided with a narrow transverse slit 14 and a suitable lens system illustrated as a lens 16. Directly behind the slit 14 is a film carrying drum 18 shown as being driven through a worm gear 20 and worm 22 from a shaft 24. The drum 18 is rotated clockwise and thus will pull the film from a reel 26, draw the film past the apertured slit 14, and permit the film to wind up on a reel 28 which is suitably driven. An electrical generator 30 is driven from the drum 18 through a friction roller 32, and has an armature 34, in the form of a toothed disc of soft iron, rotating adjacent a magnetic pickup 36, which may comprise merely a coil having a permanent magnet core with a wedge-shaped tip projecting in close proximity to the periphery of the toothed wheel.

A scanner 40 comprises a light-tight case 42 having a suitable lens system, represented by a lens 44. Extending transversely across the case 42 is a plate 46 schematically illustrated in Fig. 1 as having alternate opaque and transparent or translucent bands. These bands extend transversely to the direction of flight of the airplane which is assumed to be to the left and represented by the arrow A. The plate 46 may comprise an ordinary glass photographic plate upon which a line drawing of proper dimensions has been photographically transferred. Above the plate 46 is a radiation responsive device illustrated as a phototube 48. Other forms of devices responsive to radiation originating at or reflected from the terrain may be utilized in place of the phototube 48 and its lens system 44, it being essential merely that the scanner be capable of producing an alternating current bearing a definite relation to the speed of the optical image of the terrain which traverses the exposure slit 14 of the camera.

In Fig. 2, the scanner case 42 is illustrated as being provided with a vertical partition 50 to form separate light-tight compartments for a pair of phototubes 52, 53, the tube 52 being above a grating 54 and the phototube 53 being positioned above a grating 55. The gratings 54 and 55 are staggered, that is, an opaque band of one is in alignment with a translucent or transparent band of the other. The case 40 is light-tight and its internal surfaces are preferably finished in a dull black so as to avoid reflections of light therefrom. It is preferable that the images traversing the gratings 54 and 55 be identical, and for this reason a pair of lenses 44 and 45, symmetrically arranged beneath the two gratings, are preferably provided.

In general, as diagrammatically illustrated in Fig. 1, the output of the radiation responsive device, such as the phototube 48, is supplied to a square wave limiting amplifier and frequency responsive network illustrated as a block 60, the output of which is supplied to a differential rectifier and relay apparatus illustrated as a block 62.

The output of the generator 30 is supplied to a square wave limiting amplifier and frequency responsive network 64, and the output of the latter is supplied to the differential rectifier and relay apparatus 62. The relay apparatus of the latter controls the direction of rotation of a control motor 66 which through bevel gearing 68 adjusts a variable speed transmission 70 driven by a drive motor 72. The variable speed transmission may be of any suitable construction capable of substantial variation in speed ratios, a transmission such as made by Graham Transmissions Inc. being suitable. The drive shaft 74 of the variable speed transmission 70 drives the shaft 24 through bevel gearing 76.

In general, the phototube 48 generates a signal which, by means of the circuits and apparatus 60, 62, and 64, is compared with the frequency generated by the generator 30 and the direction of rotation of the control motor 66 determined by which of these two frequencies is the higher. Thus, the speed of the film at the aperture slot 14 will be maintained equal to that at which the optical image traverses this slot, and changes in elevation or speed of the photographic airplane will result in rapid adjustment of the speed at which the film is driven.

The circuits and associated apparatus for effecting such adjustments in the speed at which the film is driven, are shown in detail in Figs. 3 and 3a. The phototubes 52, 53 are connected in push-pull, with the cathode of phototube 53 connected to ground and its anode connected to the cathode of phototube 52. The cathode of phototube 52 and anode of phototube 53 are connected through blocking condenser C80 and grid resistor R82 to the grid 84 of an amplifying pentode 86. A grid leak resistor R88 is connected between ground and the junction of C80 and R82. A filtering condenser C90 in conjunction with a resistor R92 serves to filter the operating potential for the phototubes 52 and 53 and a bleeder resistor R94 is connected between the resistor R92 and ground to maintain a definite potential across the phototubes 52, 53.

The plate or B potential is obtained from a motor generator 96 energized from a suitable battery 98 and having its generator output terminals connected respectively to ground and a filtering inductance L100. The motor generator is adapted to supply a direct voltage of 250 volts and has a terminal marked +250 v., to which various circuits are connected, as will appear hereinafter. The inductance L100 is connected between the generator 96 and a conductor 102, a filtering condenser C104 being preferably connected between the conductor 102 and ground. The conductor 102 is connected to a conductor 106 through series filtering resistors R108 and R110, these resistors having filtering condensers C112 and C114 associated with them.

The cathode of pentode 86 is connected to ground through a biasing resistor R116, while the screen grid of this tube is connected to the conductor 106 through a voltage dropping resistor R118 and is by-passed to ground through a condenser C120. The suppressor grid of the pentode 86 is externally connected to the cathode thereof. Plate voltage is supplied to the pentode 86 from the conductor 106 through a filtering resistor R122 and series load resistor R124, the junction between these resistors being connected to ground through a filtering condenser C126.

The output of the pentode 86 is coupled to the input of a triode 128 through a coupling condenser C130 and series grid resistor R132. The triode 128 may be of 6SN7 type, which is a twin triode high vacuum tube, the other triode section 134 of the tube being utilized as a diode, the grid and plate thereof being connected to ground and the cathode being connected to the grid of the triode 128. The diode is thus operative to limit the degree of negative voltage which may be impressed upon the grid of the triode 128, while the grid of the triode limits the grid voltage on the positive portion of the cycle. The cathode of the triode 128 is connected to ground through a biasing resistor R136. Plate current is supplied to the triode 128 through a load resistor R138. The section of the amplifier including the diode 134 and triode 128 operate to limit the positive and negative swings of the signal supplied thereto so as to distort the signal derived from the pentode 86, which may be generally of sine wave shape, into a generally rectangular wave shape.

A second similar stage of amplification and amplitude limiting comprises a triode 140 and a diode 142, which are coupled to the output of the triode 128 through a coupling condenser C144 and series grid resistor R146. The cathode of the triode 140 is connected to ground through a biasing resistor R148. Plate current is supplied to the triode 140 through a load resistor R150 connected to the conductor 102.

The output of the triode 140 is coupled to a third stage of amplification and amplitude limiter, comprising a triode 152 and diode 154 through a coupling condenser C156 and series grid resistor R158. The cathode of the triode 152 is connected to ground through a biasing resistor R160. A voltage divider comprising high value resistors R162 and R164, is connected between ground and the junction of condenser C156 and resistor R158. The junction between resistors R162 and R164 has a conductor 166 connected thereto to supply a signal to an auxiliary control, as will appear hereinafter. Plate current is supplied to the triode 152 from the conductor 102 through a load resistor R168 (Fig. 3a) and the output of the triode 152 is coupled to the input of a pentode 170 through a coupling condenser C172 and a series grid resistor R174. A grid return circuit for the pentode 170 includes the series resistor R174 and a high value resistor R176. The cathode of the pentode 174 is connected to ground through a biasing resistor R178 shunted by a condenser 180, while the voltage for the screen grid of this tube is provided through a voltage divider comprising resistors R182 and R183. The pentode 170 is provided with plate current through a load resistor R184 connected to the +250 v. terminal of the motor generator.

The output of the pentode 170 is supplied through a blocking condenser C186 to a conductor 188, the condenser C186 also forming part of a frequency responsive mesh, as will appear hereinafter. The frequency of the signal output of the pentode 170 is compared with the frequency of the output of the electromagnetic generator 30, in a manner hereinafter to be described in detail.

The output of the generator 30 is amplified and has its wave form distorted into substantially rectangular shape by an amplifying and wave amplitude limiting circuit similar to that utilized for the amplification of the output of the phototubes 52, 53. The generator 30 is coupled to the grid of a pentode 190, which like the pentode 86, may be of the 6SJ7 type, through a low pass filtering mesh comprising a resistor R192 and a condenser C194. The cathode of the pentode 190 is connected to ground through a biasing resistor R196 shunted by a condenser C198, while the screen grid of this pentode is supplied with a suitable operating potential from a conductor 200 through a voltage dropping resistor R202, a by-pass condenser C204 connecting the screen grid to ground. Plate current is supplied to the pentode 190 through a load resistor R206, while the output of the pentode is coupled to the input of a triode 208 through a blocking condenser C210. A return circuit for the grid of the triode 208 is provided by a resistor R212.

Plate current is supplied to the triode 208 through a load resistor R214 from a conductor 216, which it will be noted is connected to the conductor 102 through a filtering resistor R218 (Fig. 3a), the conductor 216 being connected to ground through a filtering condenser C220.

The output of the triode 208 is coupled to an amplifying and voltage limiting section comprising a triode 222 and a diode 224 through a blocking condenser C226 and series grid resistor R228. Plate current is supplied to the triode 222 through a load resistor R230 connected to the conductor 216 and the output of the triode 222 is coupled to the input of an amplifying pentode 232 through a blocking condenser C234 and series grid resistor R236. A grid return circuit is provided by the resistor R236 and a resistor R238. The cathode is connected to ground through a biasing resistor R240 shunted by a condenser C242, while suitable operating voltage for the screen grid is provided through a voltage divider comprising resistors R244 and R245. Plate current for the pentode 232 is supplied from the +250 v. terminal of the motor generator 96 through a load resistor R246. The output of the pentode 232 is transmitted through a blocking condenser C248 which also forms part of a frequency responsive network, to be described hereinafter. The plate voltage on the conductor 200 is supplied from the conductor 102 through a filtering resistor R250, the conductor 200 being connected to ground through a filtering condenser C252.

The output of the pentode 232 is impressed across a frequency responsive network comprising condenser C248, resistor R256, and blocking condenser C258. In a similar manner, the output of the pentode 170 is impressed across a frequency responsive network comprising condenser C186, resistor R260, and condenser C258. A diode 262 has its plate connected to the conductor 254 and has its cathode connected to a junction point 264 through a load resistor R266, the resistor R266 being shunted by a filter condenser C268. In a similar manner, a diode 270 has its plate connected to the conductor 188 and its cathode connected to the junction 264 through a load resistor R272 normally shunted by a condenser C273. The cathode of the diode 262 is connected to the control grid of an amplifying pentode 274, while the cathode of the diode 270 is connected to the control grid of an amplifying pentode 276 through a relay switch 278.

The control grid of pentode 274 is connected to ground through a grid return resistor R280, while the control grid of pentode 276 is connected to ground through a relay operated switch 282 and grid return resistor R284. The cathode and suppressor grids of the pentodes 274 and 276 are connected to ground through a common biasing resistor R286, while the screen grids of these pentodes are connected to the conductor 102 through a voltage dropping resistor R288. Plate current is supplied to the pentodes 274 and 276 from the conductor 102 through load resistors R290 and R292, respectively.

The outputs of the pentodes 274 and 276 are respectively directly connected to the grids of power amplifying tetrodes 294 and 296. The cathodes of these tetrodes are connected to a fixed potential source indicated as +28 v., while the screen grids of these tubes have a suitable operating potential impressed thereon through a voltage divider comprising resistors R298 and R299 connected between the +250 v. terminal and ground. Plate current is supplied to the tetrodes 294 and 296 from the +250 v. terminal through windings of relays 300 and 302.

The relay 300 is adapted to operate a single pole double throw switch 304, while the relay 302 is provided with a similar switch 306, these switches being respectively connected to the terminals of the motor 66. The switches 304 and 306, when their relays are deenergized, make contact with one terminal of a source of current for the motor 66, indicated as a battery 308, whereas when either of these relays is energized its switch arm 304 or 306 makes contact with a grounded terminal of the battery 308. A field winding 310 for the motor 66 is connected across the battery 308. It will be apparent that when only the relay 302 is energized, the motor 66 will rotate in one direction, while it will rotate in the opposite direction when only the relay 300 is energized. When both relays 300 and 302 are energized, it will be apparent that no current will be supplied to the armature of the motor 66, and this condition will also prevail when neither of these relays is energized.

When the signal supplied by the phototubes is of insufficient amplitude to constitute a significant signal, it is desirable to prevent such signal from having a controlling effect upon the output system including the tubes 270, 276, and 296. The means for preventing the signal from having such effect includes the relay switches 278 and 282 operated by a relay winding 312, shunted by a filter condenser C314.

The signal derived from the voltage divider comprising resistors R162 and R164, is supplied through the conductor 166 and coupling condenser C316 to the control grid of a pentode 318. A grid return resistor R320 is connected between the control grid of this pentode and ground. The suppressor grid and cathode of the pentode 318 are connected to a suitable direct current potential source indicated as +6 v., which may be obtained from a voltage divider resistor R322 (Fig. 3) connected across the battery 98. A suitable operating potential is supplied to the screen grid of the pentode 318 through a voltage divider comprising resistors R324 and R325, the latter resistor being shunted by a filter condenser C326. Plate current is supplied to the pentode 318 from the conductor 102 through a load resistor R328. The plate of pentode 318 is directly connected to the control grid of a triode 330. A filter condenser C332 is connected between the grid of triode 330 and ground. The cathode of this triode is connected to a suitable source of operating potential, indicated as the +28 v. terminal of the battery 98. Plate current for the triode 330 is supplied through the relay winding 312 from the conductor 102.

In operation, as the airplane travels over substantially any terrain, certain parts of the terrain will reflect more radiation than others to the scanner 40, and as the images of such parts traverse the grids 54 and 55, the alternate increase and decrease in the degree of illumination on the phototubes 52 and 53 will cause the latter to generate an alternating current, the two phototubes operating in 180° phase relation due to the staggered relation of the grids or gratings 54, 55. It is not essential that this push-pull arrangement of the phototubes be utilized, since reasonably satisfactory results may be obtained by the use of a single phototube. The push-pull arrangement of the phototubes is, however, preferred, because of the higher amplitude signal provided thereby, and what is more important, because of the cancellation of ambient changes in the degree of illumination from the terrain.

The manner of the operation of the scanner may best be understood by considering the light radiated from a single bright spot on the earth, such as a house. As the plane passes over such object, the image thereof will successively traverse the translucent and opaque bands of the gratings 54 and 55, and thus periodically increase and decrease the illumination of the phototube 54, while simultaneously decreasing and increasing the illumination on the phototube 52.

Since the image of the earth may, in so far as here relevant, be considered as consisting of a number of spots of varying brightness in random placement, the output of the phototubes will always be an alternating current whose frequency is proportional to the image speed and whose intensity is a function of the degree of contrast present in the terrain.

The scanner, instead of utilizing a phototube as a detector of variations in illumination received from the ground, may comprise any other suitable detector of radiation, such as infrared radiation, or other forms of radiation.

The output of the phototubes is amplified by the pentode 86, and due to the fact that the phototubes are of relatively high output impedance, it is preferable to place the pentode 86 close to the phototubes within the case 42. The output of the pentode 86 will generally be of substantially sine wave form. This signal output supplied to the diode 134 and triode 138, is amplified by the latter tube, but the degree of amplification in the positive direction is limited by current flow from the grid to the cathode, and is limited in the negative direction by current flow through the diode 134. Thus, if the output signal of the pentode 86 is of relatively high amplitude, the peaks of the wave will, in effect, be cut off by the operation of the triode 128 and diode 134, thereby limiting the amplitude of the output of the triode 128. This limiting action will be symmetrical with regard to the input wave, because the absence of a grid leak in the circuit causes the current drawn by the grid of the triode 128 and diode 134 to be exactly equal.

The stages respectively comprising diode 142 and triode 140, diode 154 and triode 152, operate in the same manner as the preceding stage, in that the signal is progressively amplified and the wave is progressively made more rectangular or square in shape. Thus the output of the triode 152 will be a symmetrical square wave of constant amplitude throughout wide variations in the amplitude of the input signal provided by the phototubes 52, 53.

The output of the triode 152 is fed into the input circuit of pentode 170, which operates as a power amplifier.

In a similar manner, the signal provided by the electromagnetic generator 30 is amplified and has its wave changed to a symmetrical square shape of constant amplitude through the successive amplifying stages previously described. Since the amplitude of the signal provided by the generator 30 is greater than that which may be derived from the phototubes 52 and 53, one of the amplifying and amplitude limiting stages may be omitted from the amplifying circuit for this generator.

In order to control the speed at which the film is driven, it is necessary to compare the frequencies of the outputs of the two amplifiers and regulate the variable speed transmission, depending upon the relation of these frequencies. For this purpose, the outputs of the two amplifiers are supplied through the frequency responsive meshes C186, R260, and C248 and R256. The alternating potential impressed across the resistors R256 and R260 will be a function of the frequencies supplied by the pentodes 232 and 170, respectively. As the frequency increases, the potentials across these resistors likewise increase.

These alternating potentials are rectified in the two diodes 262 and 270, and will appear as D. C. voltages across the condensers C268 and C273. These voltages will be of such polarity that their difference will appear between the control grids of the pentodes 274 and 276. The pentode, the grid of which has the higher potential in the positive direction will, accordingly, become conducting to a greater extent than the other pentode, and thereby through the power amplifying tetrodes 294 and 296, cause lesser and greater current flow through its associated relay winding 300 or 302. When the frequencies of the outputs of the two amplifying systems are the same, the potentials across the resistors R256 and R260 will likewise be the same, and as a result, the plate current flow through the power amplifying tetrodes 294 and 296 will likewise be equal. Under these circumstances, neither of the relays 300, 302 will be energized.

When, however, the frequencies of the outputs of the two amplifying systems differ, for example, if the frequency supplied by the phototubes 52, 53 exceeds that supplied by the generator 30, the relay 300 becomes energized, thereby completing the circuit through the armature of the motor 66, causing it to rotate, let us say, in the clockwise direction. Such rotation of the motor 66 will cause the variable speed transmission 70 to increase the speed ratio between the motor 72 and the shaft 74, and thereby increase the speed at which the film is driven and at the same time increase the speed at which the generator 30 is driven. The speed of the film will be increased until the frequency of the generator 30 exceeds that of the frequency of the signal generated by the phototubes 52, 53, whereupon the relay 300 will be deenergized and the relay 302 will be energized, causing the motor 66 to reverse and rotate counter-clockwise, thereby tending to reduce the speed at which the film is driven.

Under some circumstances, the terrain may provide insufficient contrast in degree of illumination to produce a square wave output signal in the pentode 170. Under these circumstances, the voltage appearing across the resistor R260 will decrease, even though there is no change in the frequency of the signal output of the pentode 170. Such decrease in potential across this resistor R260 might, therefore, cause erroneous operation of the relays 300, 302.

To avoid this possible erroneous operation of the relays, the circuit including the pentode 318 and triode 330, is provided. This circuit is effective to operate the relay 312 whenever the signal amplitude provided by the phototubes 52, 53 is insufficient as above stated, to provide a full amplitude square wave in the output of the pentode 170. When the relay is operated due to the foregoing conditions, the resulting opening of switches 278 and 282 disconnects the condenser C273 and grid of tube 176 from the diode load resistor R272 and grid leak R284. The grid of the pentode 276 therefore remains at the potential it attained from the last reliable signal. By virtue of this arrangement, the speed at which the film of the camera is driven will remain at the same speed it had when the last reliable signal was received from the phototubes 52, 53.

Since some of the circuits employed are of unusual character, it is deemed desirable herein to set forth values of such of the components as may be necessary to enable one skilled in the art to construct the apparatus. These components are as follows:

Phototube 52—929
Phototube 53—929
Pentode 86—6SJ7
Diode 134 and triode 128—6SN7
Diode 142 and diode 154—6H6
Triodes 140 and 152—6SN7
Pentode 170—6SJ7
Pentode 190—6SJ7
Triodes 202, 222—6SN7
Diode 224—one-half of 6H6
Pentode 232—6SJ7
Diodes 262, 270—6H6
Pentode 274—6SJ7
Pentode 276—6SJ7
Tetrode 294—25L6
Tetrode 296—25L6
Pentode 318—6SJ7
Triode 330—6J5

R82—5 meg.
R88—50 meg.
R116—1700 ohms
R124—.1 meg.
R132—1.0 meg.
R136—3000 ohms
R138—0.1 meg.
R146—1.0 meg.
R148—3000 ohms
R150—0.1 meg.
R160—3000 ohms
R162—10 meg.
R164—5 meg.
R168—.1 meg.
R174—1.0 meg.
R184—50,000 ohms
R192—50,000 ohms
R212—.25 meg.
R228—2.0 meg.
R230—.1 meg.
R236—2.0 meg.
R238—.1 meg.
R244—50,000 ohms
R256—.2 meg.
R260—.2 meg.
R266—2.0 meg.
R272—2.0 meg.

R280—2.0 meg.
R284—2.0 meg.
R286—3000 ohms
R288—1.0 meg.
R290—1.0 meg.
R292—1.0 meg.
R320—5.0 meg.
R324—.15 meg.
R325—50,000 ohms
C80—.003 mfd.
C130—.05 mfd.
C144—.1 mfd.
C156—.05 mfd.
C172—.1 mfd.
C186—.0017 mfd.
C194—.05 mfd.
C210—.05 mfd.
C226—.05 mfd.
C234—.1 mfd.
C248—.0017 mfd.
C258—.5 mfd.
C268—.25 mfd.
C273—.25 mfd.
C316—.001 mfd.
C332—1.0 mfd.
C326—1.0 mfd.

The foregoing components and values are those which we have found satisfactory in these circuits. It will be understood, however, that they are merely illustrative and that considerable variation therefrom is permissible in most instances, especially if compensatory changes are made in other components.

To summarize, the apparatus as a whole is effective to maintain the speed of the movement of the strip film equal to that of the speed of movement of the optical image of the terrain across the exposure slot at the surface of the film. Since the image and the film move at the same speed, the negative will be sharp and unblurred. In the event that the photographing airplane changes speed or altitude, the film speed will quickly be changed to accord with the changed conditions, without requiring any attention on the part of the pilot. The pilot need merely start and stop the operation of the camera by the usual remote control means.

It has been found that even the most uniform appearing terrain, such as a plowed field or a body of water, will reflect radiation of differing intensity from different small areas thereof, and these differences will provide sufficient contrast to cause significant signals to be generated in the phototubes and cause operation of the film speed controlling apparatus.

While we have shown and described particular embodiments of our invention, it will be apparent that numerous variations and modifications thereof may be made without departing from the underlying principles of the invention. We therefore desire, by the following claims, to include within the scope of our invention all such variations and modifications by which substantially the results of our invention may be obtained through the use of substantially the same or equivalent means.

We claim:

1. In a film speed control means for aerial cameras, the combination of a scanning apparatus producing electrical impulses corresponding to the speed of an image of the terrain in the camera, means for generating electrical impulses corresponding to the speed of the camera film, means respectively limiting the amplitudes of the signals produced by said scanning means and said generating means, means for respectively converting the frequencies of the impulses from said scanning means and generating means into potentials corresponding to the frequencies of the impulses produced thereby, variable speed means for driving the film of the camera, and means for changing the speed of said film driving means in response to the relationship of the said potentials, the change in speed of said film driving means being in a direction to cause the film speed to equal that of the optical image of the terrain at the plane at which the film is exposed.

2. A strip film aerial camera for photographing the terrain beneath an airplane and having a film conveying means, a motor for driving said means, scanning means for producing a signal frequency corresponding to the speed at which an image of the terrain traverses the plane of the portion of the film being exposed, means for producing a frequency corresponding to the speed at which the film is moved, means for respectively converting said frequencies into potentials of amplitude related to the frequencies, an adjustable variable speed transmission between said motor and said film conveying means, means to adjust said variable speed transmission, and relay means responsive to said potentials to effect operation of said adjusting means in a direction causing said film speed to equal the speed at which the image of the terrain moves at the plane of the exposed portion of the film.

3. The combination set forth in claim 2, in which means are provided to maintain constant at its last significant value the potential corresponding to the scanning frequency whenever the amplitude of the signal produced by said scanning means is below a predetermined minimum value.

4. In an aerial photographic apparatus, the combination of a camera and a scanner, said scanner comprising means for producing electrical impulses of a frequency corresponding to that of the speed of the image of the terrain appearing in the camera, means for moving the film across a slit aperture in the camera in the direction in which the optical image of the terrain moves at said aperture, means associated with said camera for producing electrical impulses corresponding in frequency to the speed of movement of the film, means for comparing the frequency of the impulses produced by said scanner with the frequency of the impulses produced by said generating means, and means for regulating the speed at which the film is driven in response to said comparing means in a manner to cause the film speed to move at substantially the same speed as the image of the terrain moves at the plane at which the film is exposed.

5. In aerial photographic apparatus, the combination of a camera and a photoelectric scanner, said scanner comprising means for producing electrical impulses of a frequency corresponding to that of the speed of the image of the terrain appearing in the camera at the plane of the film being exposed, means for moving the film in the direction in which the optical image of the terrain moves, means associated with said camera for generating electrical impulses corresponding in frequency to the speed of the movement of the film, means for producing voltages respectively corresponding to the frequencies of the impulses produced by said scanner and by said generating means, and means for regulating the speed at which the film is driven in response to the relative values of said voltages in a manner to cause the film speed to move at substantially the same speed as the image of the terrain moves at the plane at which the film is exposed.

6. In an aerial photographic apparatus, the combination of a strip film camera and a scanner, said scanner comprising means for producing electrical impulses of a frequency corresponding to that of the speed of the image of the terrain appearing in the camera at the plane at which the film thereof is exposed, means forming part of said camera for moving the film thereof across a slit aperture in the direction in which the optical image of the terrain moves at said aperture, means associated with said camera for producing voltages corresponding relatively to the speed at which the optical image of the terrain moves at said aperture and to the speed of movement of the camera film, and means responsive to the difference in said voltages to control the speed of movement of the camera film in a manner to cause it to equal the speed of movement of the optical image of the terrain at the plane at which the film is exposed.

7. An apparatus for aerial photography comprising a strip film camera, a motor for driving the film of said camera, a variable speed transmission coupling said motor to said camera, a device responsive to radiation from the terrain being photographed, a grid having alternate portions opaque and transparent to the radiation from the terrain and operable to cause alternate increase and decrease in the amount of radiation transmitted to said radiation responsive device as the airplane passes over portions of the terrain from which the radiation differs in intensity, means including said radiation responsive device for converting variations in radiation received thereby into electrical signal impulses, means for amplifying said impulses and limiting the peak values thereof, an electrical generator driven at a speed corresponding to the speed at which the film of the camera is driven, means for amplifying and limiting the peak amplitude of the signal produced by said generator, means for converting the square wave signal impulses produced by said amplifying and limiting means into electrical potentials of values corresponding respectively to the frequencies of impulses generated by said radiation responsive device and said electrical generator respectively, means for comparing the amplitudes of said electrical potentials, and means for adjusting said variable speed transmission in response to the operation of said comparing means thereby to cause the speed at which the film is driven to substantially equal the speed at which an image of the terrain moves at the plane at which the film is exposed.

8. In an aerial photographic apparatus, the combination of a strip film camera, a scanner, said camera including a variable speed means for driving the film, said scanner comprising means for producing electrical impulses of a frequency corresponding to that of the speed of the image of the terrain in the camera at the plane at which the film is exposed, an electrical generator generating signal impulses of frequency proportional to the speed at which the camera film is driven, means for respectively amplifying and limiting the peak amplitudes of the electrical signal impulses produced respectively by said scanner and said generator, means respectively producing voltages bearing a definite relationship to the frequencies of the signals at the outputs of said amplifying and limiting means, electrical circuit means for comparing said voltages, relay means operated in one of two ways depending upon which of said voltages is the higher, and means for increasing the speed at which the camera film is driven when said relay means are operated in one way and to decrease the speed at which the camera film is driven when said relay means are operated in the other way, thereby to cause the speed of the film to be maintained substantially equal to the speed of the image of the terrain at the plane at which the film is exposed.

9. In an aerial photographic apparatus, the combination of a strip film camera having a variable speed means for driving the film, a scanner, said scanner comprising means for producing electrical impulses of a frequency corresponding to that of the speed of the image of the terrain appearing in the camera at the plane at which the film thereof is exposed, means forming part of said camera for moving the film thereof across a slit aperture in the camera in the direction in which the optical image of the terrain moves at said aperture, means associated with said camera for producing potentials corresponding in amplitude respectively to the speed at which the optical image of the terrain moves at said aperture and to the speed of movement of the camera film, and means responsive to the difference in said potentials to control said variable speed means in a manner to cause the speed of movement of the film to equal the speed of movement of the optical image of the terrain at the plane at which the film is exposed.

10. The combination set forth in claim 9, in which means are provided to maintain the potential representing the frequency of the signal impulses from said scanner for a substantial period after the amplitude of the signals produced by said scanner drops below a significant value.

11. The combination set forth in claim 9, in which means responsive to the amplitude of the impulses produced by said scanner are provided to maintain constant the potential representing the frequency of the impulses from said scanner during intervals while the amplitude of the signal impulses from the scanner is insufficient reliably to represent the speed of relative movement of the camera and terrain.

12. The method of controlling the film speed of an aerial camera used to photograph the terrain, which comprises, producing an electrical signal of frequency corresponding to the angular speed of relative movement between the camera and a point on the terrain being photographed, producing an electrical signal of frequency corresponding to the speed of the film, continuously comparing the frequencies of said signals, and regulating the speed at which the film is moved in accordance with such comparison and in a manner to cause the speed of the film to correspond to the angular speed of relative movement of the camera with respect to the part of the terrain being photographed.

13. The method of controlling the film speed of a strip film aerial camera used to photograph the terrain, which comprises, producing an electrical potential corresponding in amplitude to the angular speed of relative movement between the camera and a point on the terrain being photographed, producing an electrical potential corresponding in amplitude to the speed of the film, continuously comparing the amplitudes of said potentials, and regulating the speed at which the film is moved in accordance with such comparison and in a manner to cause the speed of the film to correspond to the angular speed of relative movement of the camera with respect to a point on the terrain.

DAVID HANCOCK, Jr.
HERBERT E. MEINEMA.